United States Patent Office 3,145,244
Patented Aug. 18, 1964

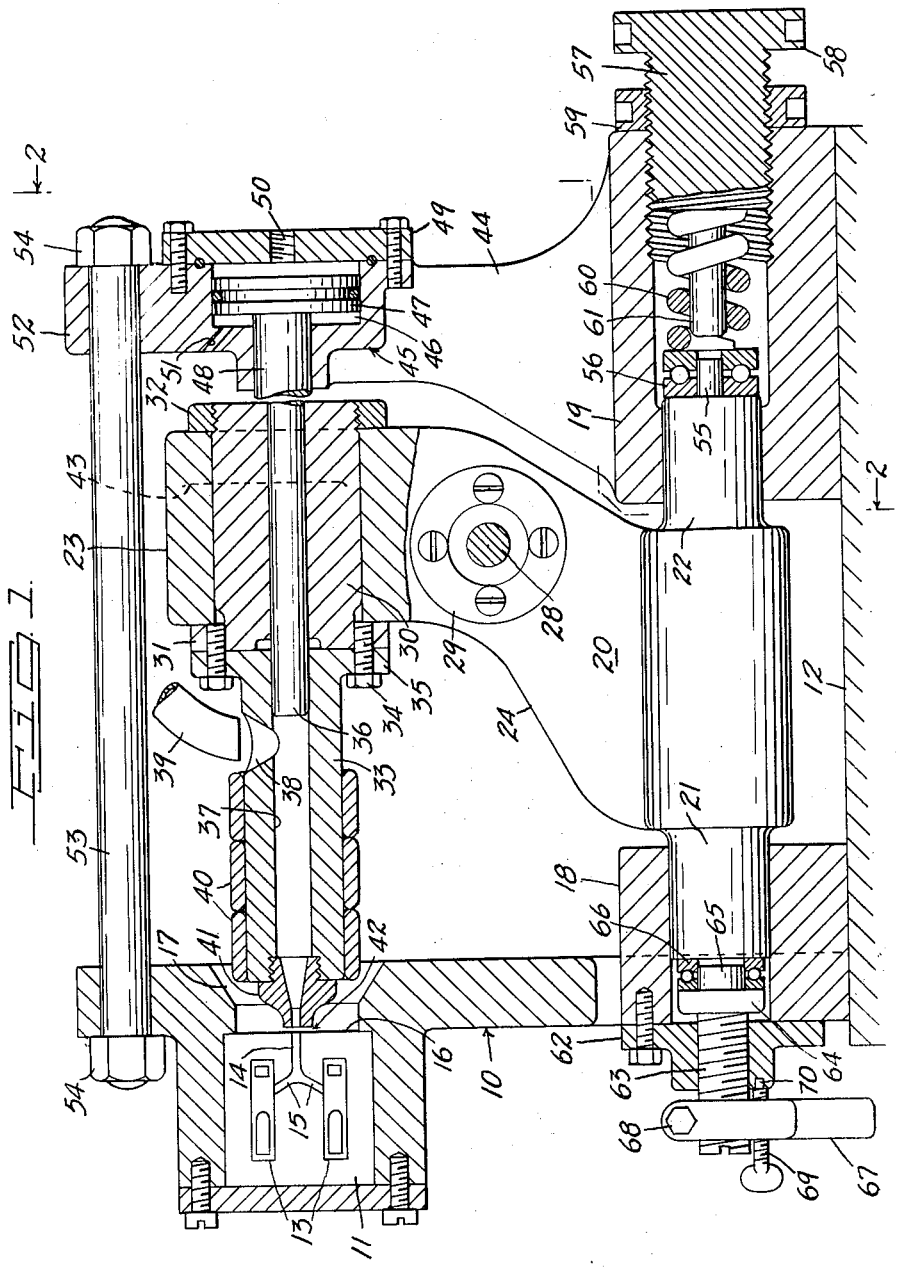

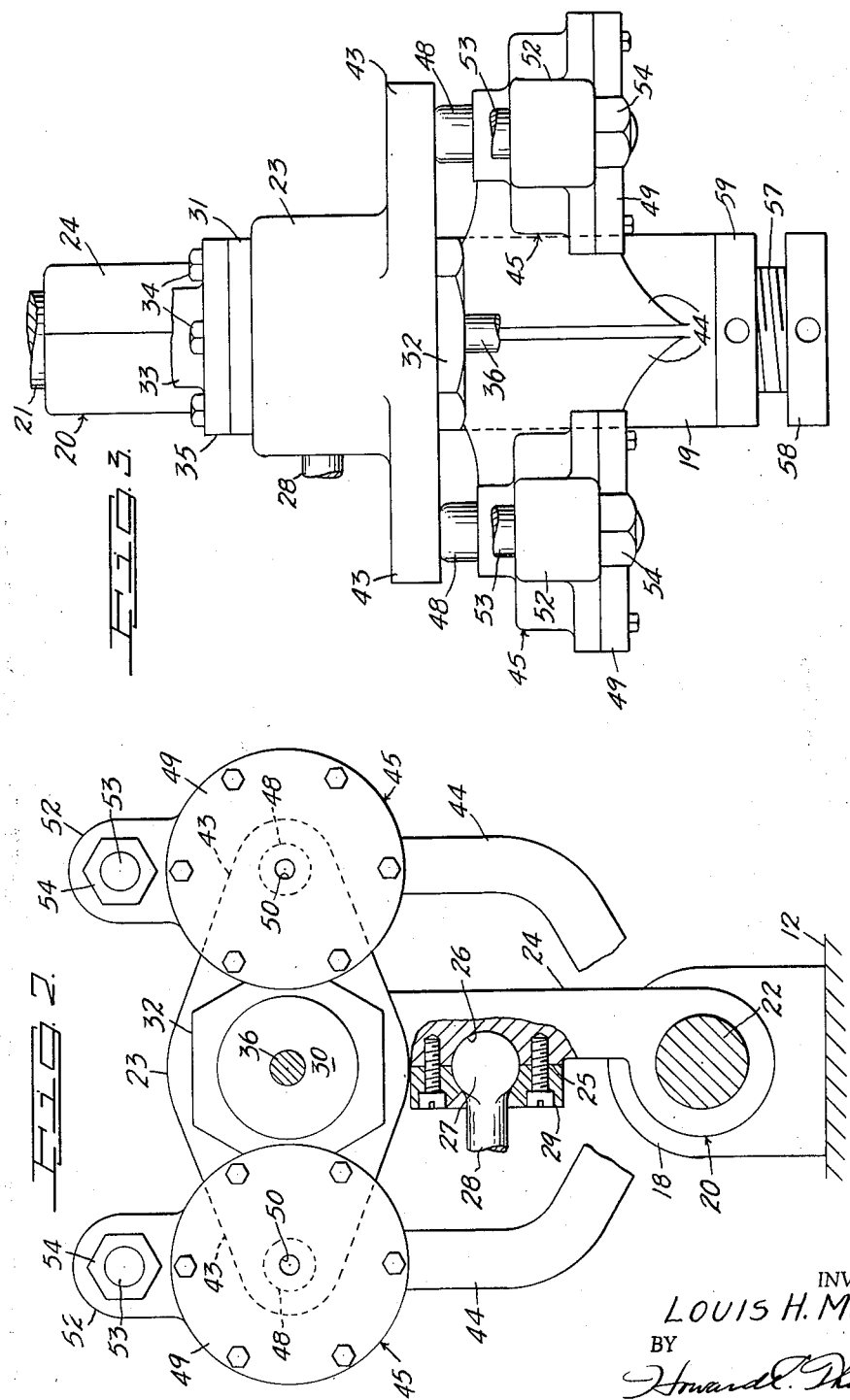

3,145,244
METHOD AND APPARATUS OF OBTAINING PRECISE NOZZLE CONTACT ON PLASTIC INJECTION MOLDING MACHINES
Louis H. Morin, 125 Beechwood Ave., Bronx, N.Y.
Filed Oct. 9, 1961, Ser. No. 143,615
11 Claims. (Cl. 264—328)

This invention relates to an apparatus employed in conjunction with plastic injection molding machines for control of the gap between the injection nozzle and the surface of the die in obtaining precise nozzle contact while, at the same time, controlling separation of the nozzle from the die, particularly in molding machines operating at high speed.

More particularly, the invention deals with a method of controlling precise operation of the nozzle with respect to the die surface in operation of an injection molding machine.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is generally a longitudinal central sectional view through an apparatus made according to my invention, with parts of the construction shown in section in lines offset with respect to the central line and with parts of the structure broken away, the illustration of the die structure being entirely schematic.

FIG. 2 is an end and sectional view generally on the broken line 2—2 of FIG. 1; and FIG. 3 is a plan view of one end portion of the apparatus, with parts of the construction broken away.

In the present illustration, only the injection cylinder and nozzle of a molding machine and part of the die structure are shown, as all mechanisms of the molding machine are otherwise eliminated in simplifying the present illustration. In other words, the method and apparatus forming the subject matter of this invention would be applicable to machines of any type and kind.

In FIG. 1 of the drawing, 10 represents part of the front plate of a molding machine having suitable means for support of a die 11, the plate 10 being supported upon a suitable base 12. In the construction shown, the face of the die 11, diagrammatically shown, illustrates the formation of two pulls 13 of a slide fastener, the die 11 having a gate passage 14 with two branches leading to the pull cavities, as indicated at 15. The gate passage 14 opens through the contact surface 16 of the die, said surface being exposed to a large opening 17 in the plate 10.

My improved apparatus consists of two bearings 18 and 19 supported upon the base in spaced relationship to each other, the bearings supporting a main bracket 20 having shaft extensions 21 and 22 arranged in the bearings 18 and 19, respectively.

The upper end of the bracket 20 has a cylindrical portion 23 which joins the lower portion of the bracket in a wall 24 offset with respect to the pivot axis of the bracket formed by the shaft extensions 21 and 22, as will clearly appear from a consideration of FIG. 2 of the drawing. The surface 25 of the wall 24 has a half-round recess, as indicated at 26, in which the ball end 27 of a link 28 seats and fixed to the surface 25 is a recessed cap 29 retaining the ball end 27 in position on the wall 24. The link 28 is actuated by suitable means on a molding machine for swinging the bracket on its pivot axis for purposes later described.

Mounted in the cylindrical portion 23 at the upper end of the bracket 20 is a sleeve 30 having a flanged end 31 seating on one surface of the cylindrical portion 23, the sleeve being threaded, at its other end, to receive a nut 32 in securing the sleeve to the bracket.

Secured to the flange 31 of the sleeve is an injection cylinder 33, this coupling being by way of several screws 34 passed through a flanged end 35 on the cylinder. Mounted in the cylinder is a piston 36 actuated by suitable means, not shown, of the molding machine in advancing plastic crystals deposited into the bore 37 of the cylinder through an opening 38 and from a feed tube 39 adjacent the opening 38, the tube being connected with a suitable source of supply.

Suitable electric heaters 40 are employed on the cylinder to heat the plastic material prior to its discharge from the cylinder through a nozzle 41 attached to the discharge end of the cylinder, as with other molding machines of this general type and kind. In FIG. 1 of the drawing, the discharge end of the nozzle is shown in spaced relation to the surface 16 of the die to diagrammatically illustrate the gap 42 between the nozzle end and said surface 16. At this time, it will be understood that, in movement of the bracket through the medium of the link 28, the nozzle 41 is moved relatively to the surface 16 of the die into registering position with the gate 14, or out of registration therewith in each cycle of operation of the machine in order to control and maintain proper functioning of the injection cylinder and discharge of the heated plastic material through the gates 14, 15 into the cavities in forming the dual pull castings.

Considering FIGS. 2 and 3 of the drawing, it will appear that the cylindrical portion 23 of the bracket includes laterally extending wings or ears 43, the purpose of which will be later described.

Considering FIG. 2 of the drawing, it will appear that the bearing 19 has laterally and upwardly extending arms or struts 44, the upper ends of which include air cylinders, generally identified by the reference character 45. One of these cylinders is shown in the irregular or broken section of FIG. 1 in order to simplify the present drawings and, as each of these cylinders are of the same construction, the brief description of the cylinder shown in section in FIG. 1 will apply to both cylinders. Mounted in the bore 46 of the cylinder is a suitable sealed piston 47 having an outwardly projecting piston rod 48 which projects from the cylinder 45 and bears upon adjacent surfaces of the wings or ears 43, as clearly seen in FIG. 3 of the drawing. The bore 46 of the cylinder is closed by a plate 49, having a threaded aperture 50, with which a pipe or tube is coupled for admission of air into the bore 46 in actuation of the piston 47. The cylinder 45 also includes an exhaust passage 51 for exhausting the air at the opposed side of the piston, as will be apparent. Each of the cylinders 45 include upwardly directed lugs 52, clearly shown in FIG. 2 of the drawing, and coupled with these lugs are bolts 53 which extend to and are coupled with the plate 10, nuts 54 being employed on ends of the bolts for securely positioning the upper end of cylinders 45 with respect to the plate 10.

Now, considering the bearing 19, it will appear that the shaft extension 22 includes a reduced portion 55 at its inner end, upon which is mounted a thrust ball bearing 56. Adjustable in the outer end of the bearing 19 is a tension screw 57, having an enlarged spanner-wrench head 58, a lock nut 59 being employed to retain the screw 57 in adjusted position. The screw 57 operates upon a coil spring 60 mounted in the bushing in applying tensional movement of the bracket 20 to the left or in movement of the nozzle 41 in the direction of the surface 16. The spring 60 is centralized in the bearing on a projecting pin 61 at the inner end of the screw 57.

Supported upon the outer surface of the bearing 18 is a cap 62 threaded to receive a threaded stud 63 having an enlarged head 64 at its inner end, the head having a reduced portion 65, upon which a thrust ball bearing 66 is supported, the bearing seating upon the adjacent end of the shaft extension 21. The stud 63 projects beyond the cap 62 and mounted thereon is a lever 67 having a split clamp end 68 for retention of the lever upon the screw, the lever also supporting a thumbscrew 69, the inner end of which is adapted to be keyed to the cap, as indicated at 70. The stud 63, by its adjustment, controls forward advancement of the nozzle 41 by action of the spring 60 in control of the gap 42. It is also important to note at this time that, when a machine warms up, expansion, due to the prevailing heat, could offset a pre-adjusted gap clearance and, in such instances, the operator can adjust the stud 63 so as to control the gap in providing the desired precise setting and, after this adjustment has been made, continued operation of the machine will result in proper functioning of the apparatus at all times.

By precise control of the gap 42, which is highly exaggerated in the showing in FIG. 1, proper functioning of the molding machine can be maintained at all times, so as to prevent the plastic material from oozing out of the nozzle or in chilling of the material against the surface of the cool die. I have found from experimentation that a gap in the neighborhood of .002" to .003" should be maintained, particularly in the molding of nylon, Delrin and cellulose acetate.

In operation of the apparatus and in timed relationship with the injection stroke of the piston 36, air, under pressure, is injected into the cylinders 45 to actuate the pistons 46 therein to advance the nozzle 41 into pressure engagement with the surface 16, taking up the pre-adjusted gap, as will be apparent, this operation taking place when the nozzle 41 is in registration with the gate 14. Immediately after the shot has taken place or, in other words, the castings formed in the cavities 13, the air pressure to the cylinders 45 is cut off, which allows the nozzle to return to its gap relationship with respect to the surface 16 of the die.

In the above operation and due to the adjustments as provided, it would appear that no forward advancement of the nozzle 41 could take place. However, I have found from extensive experimentation that, by applying air pressure from the two cylinders 45, as clearly viewed in FIG. 3 of the drawing, to the ears 43, there will be sufficient flexure through the wall 24 of the bracket 20 to permit the nozzle to advance the fraction of an inch referred to in bringing the nozzle end into positive engagement with the surface 16 of the die. In other words, the spring 60 serves primarily to maintain the bracket in its adjusted gap position controlled by adjustment of the stud 63 and, from this gap adjustment, the nozzle can be adjusted in the manner defined and a positive control provided, preventing or eliminating improper functioning of each injection stroke of the cylinder in discharge of the heated plastic material into the cavity or cavities of the die. The swinging or oscillating movement imparted to the bracket provides the well-known shearing-off or nozzle sealing action which immediately takes place after each shot operation of the casting machine.

It will be understood that the support and arrangement of the die structure in the accompanying drawing is purely schematic in a diagrammatic illustration of the present method and apparatus in providing precise nozzle contact control in operation of injection molding machines. By way of illustration of adaptations of the invention, the same could be applied to casting methods as disclosed in my prior application, Serial Number 721,042, filed March 12, 1958, now Patent No. 3,068,519, wherein a distinctly different type of nozzle structure is disclosed.

For purposes of description, the pressure medium employed such, for example, as the air cylinders, may be said to comprise a power source for flexibly or yieldably advancing the support of the nozzle in advancing the nozzle into engagement with the die surface to overcome the pre-fixed and adjusted gap, to which the nozzle is adjusted with respect to the surface of the die.

Having fully described my invention, what I claim as new and desire to secure by Letters Patent is:

1. In injection molding apparatus of the character described, means for supporting a die structure, an injection cylinder having a nozzle end movable toward and from a surface of a die, means for heating plastic material introduced into said cylinder forwardly of a plunger mounted in the cylinder for pressure discharging heated plastic material through said nozzle into cavity portions of the die, a bracket pivotally mounted in the apparatus supporting said cylinder for movement of the nozzle into different positions with respect to the surface of the die, means for swinging said bracket on its pivot, means for manually adjusting the position of the bracket in controlling gap spacing of the nozzle with respect to the surface of the die, tensional means for supporting the bracket in the pre-adjusted position thereof, and pressure means in direct operative engagement with said bracket for moving the nozzle into position engaging the surface of the die in closing the pre-adjusted gap spacing of the nozzle with respect to the die by flexing said bracket without stressing it beyond its elastic limit and thus providing for the return of said nozzle to a position spaced from said dies upon release of said pressure means.

2. A structure as defined in claim 1, wherein the pressure means comprises a pair of cylinders disposed at opposed sides of said injection cylinder, said pair of cylinders having pistons including projecting piston rods, and said rods operatively engaging means on the bracket.

3. A structure as defined in claim 2, wherein said last named means of the bracket comprises laterally extending ears on said bracket.

4. A structure as defined in claim 3, wherein said manually adjustable means comprises a stud operatively engaging one pivot end of the bracket, a lever for actuating said stud, and means for definitely keying the stud in predetermined adjusted position.

5. A structure as defined in claim 4, wherein said tensional means comprises a coil spring operatively engaging another pivot end of said bracket, and a manually adjustable screw controlling tension of said spring.

6. In injection molding apparatus of the character described, means for supporting a die structure, an injection cylinder having a nozzle end movable toward and from a surface of a die, means for heating plastic material introduced into said cylinder forwardly of a plunger mounted in the cylinder for pressure discharging heated plastic material through said nozzle into cavity portions of the die, a pair of spaced bearings, a bracket having shaft extensions mounted in said bearings, said bracket having means supporting said injection cylinder, means coupled with the bracket for moving said cylinder and nozzle relatively to the surface of the die, one of said bearings having manually adjustable means controlling gap spacing of said nozzle with respect to said surface of the die, the other bearing having adjustable tensional means for constantly urging the bracket in said pre-adjusted position, the injection cylinder supporting portion of said bracket including projecting means, and a pressure means operatively engaging the projecting means of said bracket for flexibly moving the nozzle into position closing the gap and into positive engagement with the surface of the die at the period of pressure injecting material into the die cavity in each cycle of operation of the machine by flexing said bracket without stressing it beyond its elastic limit and thus providing for the return of said nozzle to a position spaced from said dies upon release of said pressure means.

7. A structure as defined in claim 6, wherein said pressure means comprises a cylinder, a piston in the cylinder, and a piston rod projecting from the cylinder and operatively engaging the projecting means on said bracket.

8. A structure as defined in claim 7, wherein the second named bearing includes means supporting said last named cylinder.

9. A structure as defined in claim 6, wherein said gap adjusting means includes means for definitely keying the same in predetermined adjusted position.

10. In a method of molding in an injection molding machine employing a die, an injection cylinder having a nozzle end through which heated plastic material is pressure injected into a cavity portion of the die and a pivoted bracket for support of said cylinder, the method which comprises manually adjusting the position of the bracket to control predetermined gap spacing of the nozzle with respect to the surface of the die, applying a pressure means to the bracket to flex said bracket to advance the nozzle in the direction of said surface of the die in closing said gap and forcibly engaging said die surface at the moment of pressure injection of the plastic material into the die cavity, then releasing said pressure means to permit withdrawal of said nozzle from contact with said dies and finally moving said nozzle out of alignment with the opening in said dies.

11. In a method of molding in an injection molding machine employing a die, an injection cylinder having a nozzle end through which heated plastic material is pressure injected into a cavity portion of the die and a pivoted bracket for support of said cylinder, the method of controlling spacing and actuation of a nozzle with respect to the surface of a die, which consists in manually adjusting and controlling predetermined gap spacing of the surface of the nozzle with respect to the surface of the die, and then in applying pressure to the means supporting said nozzle to flex said supporting means to move the nozzle in position to close the gap spacing and firmly engage the surface of the die at the moment of pressure injecting material through the nozzle into a cavity of the die.

References Cited in the file of this patent

UNITED STATES PATENTS

| | | |
|---|---|---|
| 2,244,425 | Marinsky et al. | June 3, 1941 |
| 2,272,220 | Morin et al. | Feb. 10, 1942 |